United States Patent

[11] 3,630,712

| [72] | Inventors | Marion Lipscomb Brown, Jr.;<br>Albert Wise Green; Elmer Ladelle Blanton,<br>all of Yazoo, Miss. |
|---|---|---|
| [21] | Appl. No. | 806,733 |
| [22] | Filed | Mar. 12, 1969 |
| [45] | Patented | Dec. 28, 1971 |
| [73] | Assignee | Mississippi Chemical Corporation<br>Yazoo City, Miss. |

[54] STABILIZED AMMONIUM NITRATE COMPOSITIONS
1 Claim, No Drawings

[52] U.S. Cl. .................................................. 71/59,
23/103, 71/35, 71/64 E
[51] Int. Cl. .................................................. C05c 1/02,
C05c 3/00
[50] Field of Search ................................... 71/64 E, 59,
35; 23/103

[56] References Cited
UNITED STATES PATENTS

| 3,317,276 | 5/1967 | Brown et al. | 23/103 |
|---|---|---|---|
| 3,418,255 | 12/1968 | Brown et al. | 71/59 X |

*Primary Examiner*—Samih N. Zaharna
*Assistant Examiner*—Bennett H. Levenson
*Attorney*—Oblon, Fisher and Spivak ABSTRACT: Stabilized ammonium nitrate in crystallized mixture with amounts of boric acid, diammonium phosphate, and ammonium sulfate in proportions which markedly reduce the physical sensitivity of the ammonium nitrate to II-IV and/or III-IV crystal-type transitions and its use in particulate ammonium nitrate production to reduce dust formation.

STABILIZED AMMONIUM NITRATE COMPOSITIONS

SUMMARY OF INVENTION

This invention relates to stabilized ammonium nitrate compositions and to processes for their production. More particularly, it relates to substantially pure ammonium nitrate stabilized as a crystallized mixture comprising boric acid or an ammonium salt thereof, diammonium phosphate and diammonium sulfate, in which a. the percentage by weight of boric acid compound is from 0.015 to 0.15 percent;

b. the percentage by weight of diammonium sulfate is from 0.0015 to 0.015 percent;

c. the percentage by weight of diammonium phosphate is from 0.03 to 0.2 percent;

d. the ratio of diammonium phosphate to diammonium sulfate is from 10 to 35;

e. the ratio of diammonium sulfate to boric acid compound is from 0.05 to 0.2;

f. the ratio of diammonium phosphate to boric acid compound is from 1 to 3.5, provided that at least one of (i) the ratio of diammonium phosphate to diammonium sulfate and (ii) twice the ratio of boric acid compound to diammonium sulfate is other than 20.

The invention sought to be patented, in its process aspect, resides in the concept of substantially pure ammonium nitrate stabilized in the aforesaid manner. In another aspect, the invention resides in stabilizing the ammonium nitrate with less than 0.1 percent boric acid compound.

The tangible embodiments of the composition aspect of this invention are characterized by improved physical stability, i.e., greater hardness and resistance to caking, lower moisture sensitivity and/or breakdown in particle size, particularly when subjected to repeated passage through the III–IV crystal-type transition temperature.

The process aspect of this invention when performed is characterized by reduced production of the undesired fines and dust normally produced when ammonium nitrate or compositions comprising it are rapidly heated or cooled through the II–IV crystal-type transition temperature range. In the preferred aspects, the physical breakdown of the ammonium nitrate due to III–IV crystal transitions is substantially eliminated.

BACKGROUND OF INVENTION

The change in crystal type which normally occurs when ammonium nitrate passes through 184° F. (II–III), 90° F. (III–IV), and rapidly through the 111°–124° F. (II–IV) range results in a breakdown of larger particles (+20 mesh and larger) into smaller particles. In commercial production of prilled, granulated and pelletized ammonium nitrate, such smaller particles, i.e., dust or fines, must be separated from the product and reprocessed in the plant. In prilled ammonium nitrate production, the dust is separated and then redissolved as a weak liquor solution. Evaporators then remove this water, which increases the cost of the process. The recovered ammonium nitrate is then reprilled after evaporation, thereby increasing the load on the prilling tower, and the drying and cooling drums, which reduces the capacity of the plant. Thus, any reduction in the amount of dust produced in the plant provides a corresponding increase in the capacity of a given plant and decreases the cost of operation.

In the prilling process, ammonium nitrate solution at 280° F. or above is sprayed in a prilling tower countercurrent to cooling air which solidifies the droplets into prills which are ultimately cooled to ambient temperature. Thus, the prills pass through the 257°, 184° and 90° F. transition temperatures. Ordinarily, the prills contain residual moisture and are dried with hot air. Thus, in commercial production, the prills are often passed rapidly through the 113°–124° F. type II–IV transition range more than once. Passage of the prills through these transition points produces cracked prills and formation of finely divided powder in the prilling tower and drying and cooling drums and weakens the structure of the unbroken prills so that they readily break of subsequent handling. A similar problem exists in the production of particulate fertilizer compositions comprising ammonium nitrate.

Even though elaborate equipment is used to remove the undesired fines or dust from the commercial product, some is nevertheless carried over. In some plants, the prills or granules are bagged at above 90° F. so that the crystals pass through the 90° F. transition point within the bag, causing some cracked prill and dust formation. However, the most complete physical breakdown of the ammonium nitrate compositions comprising it occurs on storage when prills gradually soften on long storage or crack as a result of passage through the 90° F. crystal transition temperature. This physical breakdown causes extensive formation of dust and granules or prills with cracks and/or a weak grainy structure. Therefore, even if all such dust were absent from the product when originally packed, it will subsequently be formed on handling and during storage. Ten percent or less cracked prills produce a marked deterioration in the physical properties of the product.

The most serious consequence of the physical instability of particulate ammonium nitrate when used as a fertilizer is its tendency to turn into a solid, hard cake during storage. Even when this does not occur, the fines and dust produced make the product more difficult to handle and use and thus reduces the quality thereof.

Many materials have been used to increase the physical stability of ammonium nitrate and compositions comprising ammonium nitrate, including natural phosphates, potassium metaphosphate, mono- and diammonium phosphate, ammonium sulfate, potassium chloride, magnesium salts, calcium salts, sodium silicate, clays, sodium, calcium and potassium nitrates, iron cyanides, copper oxides, etc. See, e.g., U.S. Pat. Nos. 1,406,455, 1,698,793, 1,868,890, 1,932,434, 1,939,165, 1,947,601, 1,966,947, 2,124,332, 2,136,069, 2,657,977, 2,702,747, 2,879,133, 2,901,317, 2,943,928, 2,957,763, 3,007,773, 3,018,164, 3,021,207, 3,026,193, 3,030,179, 3,034,853, 3,034,858, 3,070,435, 3,116,108, 3,117,835, and 3,148,945.

The present invention is within the scope of our U.S. Pat. No. 3,317,276. It has been discovered that selected ratios of small amounts of ammonium nitrate additives, viz, boric acid, diammonium phosphate and diammonium sulfate, produce a highly stable product. The fact that only small amounts of the above additives are required renders this invention economically attractive and thereby commercially important to the agricultural chemical industry.

It is therefore an object of this invention to provide a process for the production of crystalline ammonium nitrate and compositions comprising crystalline ammonium nitrate in which the amount of dust and fines concurrently produced is reduced.

Another object is the elimination of the 184° F. II–III crystal-type transition in particulate ammonium nitrate and ammonium nitrate composition production.

Another object of this invention is to provide a stabilized ammonium nitrate composition at the lowest possible cost without a resulting marked increase of trace elements being added to the soil.

Another object is to provide a process for the production of particulate ammonium nitrate which is harder and more resistant to softening and/or cracking on storage.

A further object is the provision of ammonium nitrate and ammonium nitrate compositions of improved physical stability.

Other objects will be apparent to those skilled in the art to which this invention pertains.

DETAILED DESCRIPTION OF INVENTION

When stabilizing materials are added to the ammonium nitrate, large amounts of any materials injurious to plant growth cannot be used when ammonium nitrate is used as a fertilizer. A large amount of boron compound, for example, is undesirable if the soil already contains excessive amounts of boron. Also, in the fertilizer industry, a slight reduction in cost may influence the selection of one process or product over another. This is especially true with the present invention wherein a judicious choice of additives results in a stable product at a low per unit cost. We have found that unusually high stabilization is achieved when the ammonium nitrate contains from 0.015 to 0.15 percent boric acid compound, from 0.0015 to 0.015 percent diammonium sulfate and from 0.03 to 0.2 percent diammonium phosphate in amounts such that at least one of (a) the ratio of diammonium phosphate to diammonium sulfate and (b) twice the ratio of boric acid compound to diammonium sulfate is other than 20 optimum stabilization is achieved. In the stabilized ammonium nitrate, the ratio of diammonium phosphate to diammonium sulfate is from about 12 to 20.

As used herein, "particulate" ammonium nitrate means in the form of separate, discrete macroparticles, e.g., prills, granules and pellets, as opposed to cast or powdered ammonium nitrate or solutions thereof. "Fines" and "dust" refer to the very small particles of ammonium nitrate, e.g., of −20 mesh, −30 mesh and smaller, normally associated with the production of granular, pelleted and prilled ammonium nitrate.

The starting liquid ammonium nitrate used in the process of this invention includes molten ammonium nitrate containing very little moisture, e.g., 0.2 to 6 percent, of the type conventionally used to produce prilled and pelletized ammonium nitrate, and aqueous solutions of ammonium nitrate, e.g., those conventionally used to produce ammonium nitrate in prilled or granulated form. This aspect of the invention is directed primarily to the purer forms of ammonium nitrate, e.g., 94 percent and preferably 97 percent or higher, whose physical instability is particularly great.

Boric acid is usually used although an ammonium salt of boric acid is sometimes preferred when the starting liquid mixture is produced by the ammoniation of nitric acid. Because of the free ammonia often present in ammonium nitrate during its manufacture, some or all of the boric acid, when it is used, is converted to an ammonium salt thereof. From 0.015 to 0.15 percent is employed.

The diammonium sulfate and diammonium phosphate function cooperatively and synergistically with the boric acid compound to improve the stability of the ammonium nitrate, particularly with respect to III–IV transition. Large amounts of ammonium phosphate are usually required to materially improve the stability of the ammonium nitrate. However, when used in conjunction with the boric acid compound and diammonium sulfate, very small amounts effectively improve the stability of the ammonium nitrate. Moreover, half as much or less of the boron compound is required to improve II–IV and III–IV transition stability. About 0.03 to 0.2 percent is employed and more preferably about 0.04 to 0.2 percent, is employed. Very small amounts, e.g., about 0.0015 to 0.015 percent, of diammonium sulfate are employed. A ratio of boric acid compound to diammonium sulfate compound from about 10 to about 20 appears to impart optimum stability.

In such mixtures, although up to about 0.4 percent by weight of the three ingredients can be used to advantage to produce a stabilized ammonium nitrate composition, preferably from about 0.08 to 0.35 percent is used. Although the highest degree of stabilization thus far achieved was from 0.135 $H_3BO_3$, 0.01 $(NH_4)_2SO_4$ and 0.2 $(NH_4)_2HPO_4$ (no cracked prills in over 1,400 III–IV transitions), excellent stabilization is also achieved with lesser amounts, e.g., as low as 0.04, 0.002 and 0.04 percent, respectively, of these additives.

One or more of the boron, phosphate and sulfate compounds employed in this invention can be added to the starting liquid form of the ammonium nitrate or formed in situ by first adding boric, phosphoric and sulfuric acid thereto followed by addition of ammonia. The latter technique can be used when manufacturing ammonium nitrate from nitric acid. When the additives are used per se rather than being formed in situ in the ammonium nitrate melt or aqueous solution or in the mixture used to produce the ammonium nitrate, they can be added as a finely divided solid or in a preformed aqueous or molten ammonium nitrate solution. Whatever technique is used, for best results thorough mixing should be employed to ensure a homogenous mixture is obtained.

As can be clearly seen from the table on page 10, examples 9 and 10 compositions show unexpectedly superior results as compared with all other compositions tested. These compositions are capable of withstanding 1,200–1,400 90° F. transitions with no breakage. Example 9 indicates the percent by weight content of the stabilizing components in the ammonium nitrate composition as 0.125 percent boric acid compound, 0.0125 percent diammonium sulfate and 0.15 percent diammonium phosphate while the ratios of these components are designated as follows:

Diammonium Phosphate/Diammonium Sulfate = 12/1
Boric Acid Compound/Diammonium Sulfate = 10/1
Diammonium Phosphate/Boric Acid Compound = 1.2/1

Similarly, the percentage weight content of the components as shown by example 10 are: 0.135 percent boric acid compound, 0.01 percent diammonium sulfate, and 0.20 percent diammonium phosphate while the component ratios are:

Diammonium Phosphate/Diammonium Sulfate = 20/1
Boric Acid Compound/Diammonium Sulfate = 13.5/1
Diammonium Phosphate/Boric Acid Compound = 1.5/1

In summarizing examples 9 and = 10, it is apparent that the percent weight content of these components comprises the ranges 0.125 to 0.135 percent boric acid compound; 0.0125 percent to 0.01 percent diammonium sulfate and 0.15 to 0.20 percent diammonium phosphate. Similarly, the pertinent range of ratios comprises: Diammonium phosphate/diammonium sulfate = 12/1 to 20/1; boric acid compound/diammonium sulfate = 10/1 to 13.5/1; the diammonium phosphate/boric acid compound = 1.2/1 to 1.5/1.

The unforeseen extent of stabilizing superiority afforded by the percent content and the ratios of the additive components within the ranges of these two examples is in essence suggestive of critical significance.

Three factors affect the degree of stabilization achieved with the stabilizing compositions of this invention. The first factor is the pH of the ammonium nitrate. If the pH is too high, i.e., so that free ammonia is present in or released from the ammonium nitrate mixture, or if the pH is too low, so that free acid is present in the mixture, improvement in stability is substantially reduced. The optimum pH for any selected stabilizing composition can readily be determined by the stability tests described hereinafter. It varies with the selected stabilizing composition, but usually is between 5.0 and 7.0 (as an 8 percent by weight solution). The third factor is the manner in which the additives composition is formed and added to the mixture. When using a combination of boric acid, phosphoric acid and sulfuric acid to form the additives, the phosphoric acid must be converted to an ammonium salt before being mixed with free boric acid. A preferred technique involves ammoniating a mixture of phosphoric acid and sulfuric acid in the selected proportion until a pH is reached whereby all the phosphoric and sulfuric acid is converted to ammonium salts. Boric acid is then added thereto and the mixture again ammoniated to a pH above 5.0. If concentrated acids are used, e.g., 93 percent sulfuric and 85 percent phosphoric, the resulting mixture is a slurry which can be pumped into the ammonium nitrate composition to be stabilized. This procedure is particularly advantageous with prilled ammonium nitrate because it does not increase the load on the evaporators and thus does not adversely affect plant capacity.

In areas having high boron content, it is desirable to employ as little boric acid as possible to stabilize the ammonium nitrate. A surprising degree of stability can be achieved with very low amounts of boric acid compound, e.g., 0.04 to 0.075 percent, by employing from 0.002 to 0.01 percent diammonium sulfate and from 0.04 to 0.2 percent diammonium phosphate, where boric acid content is critical. Outstanding results are obtained with from 0.1 to 0.135 percent boric acid compound by employing from 0.005 to 0.0125 percent diammonium sulfate and from 0.1 to 0.2 percent diammonium phosphate.

The following examples further describe and illustrate the invention. Percentages and parts are by weight.

Examples I-IX Ammonium Nitrate Prills $NH_4NO_3$ prills (0.2 percent $H_2O$) were melted and various percentages of diammonium phosphate (DAP), boric acid, and ammonium sulfate (DAS) were blended in the melt. The molten mixture was then dropped with a dropper onto a Teflon sheet to form prills and cooled. These prills were tested for resistance to breakage from cycling through the III-IV (90° F.) transition. In the III-IV transition tests, prills were heated at 110° F. for 2 hours and then cooled to about 78° F. for 2 hours. The percent prills cracked in each test were recorded after each cycle. These data are tabulated in table I.

Modifications and variations of the invention as described above will be apparent to and can be made by those skilled in the art and are therefore within the spirit of the invention.

We claim:

1. Stabilized ammonium nitrate prills of at least 97 percent purity containing a boric acid compound, diammonium sulfate and diammonium phosphate, in which
   a. the percentage by weight of boric acid compound is from 0.125 to 0.135 percent;
   b. the percentage by weight of diammonium sulfate is from 0.0125 to 0.01 percent;
   c. the percentage by weight of diammonium phosphate is from 0.15 to 0.2 percent;
   d. the ratio of the diammonium phosphate to diammonium sulfate is from 12/1 to 20/1;
   e. the ratio of boric acid compound to diammonium sulfate is from 10/1 to 13.5/1; and
   f. the ratio of diammonium phosphate to boric acid compound is from 1.2/1 to 1.5/1,
   g. and wherein the boric acid compound, diammonium sulfate and diammonium phosphate are formed as a mixture, for addition to the ammonium nitrate, by ammoniating a mixture of phosphoric acid and sulfuric acid, then adding boric acid to this ammoniated mixture and further ammoniating the resultant ammoniated mixture.

TABLE I.—AMMONIUM NITRATE COMPOSITIONS
[Percent prills cracked by 90° F. thermal shock]

| Example | 1 | 2 | 3 | 4 | 5 | 6 | 7 | 8 | 9 | 10 |
|---|---|---|---|---|---|---|---|---|---|---|
| Percent $H_3BO_3$ | 0.04 | 0.06 | 0.065 | 0.075 | 0.1 | 0.10 | 0.10 | 0.125 | 0.125 | 0.135 |
| Percent DAS | 0.002 | 0.003 | 0.01 | 0.0125 | 0.005 | 0.01 | 0.0065 | 0.0075 | 0.0125 | 0.01 |
| Percent DAP | 0.04 | 0.06 | 0.02 | 0.15 | 0.1 | 0.13 | 0.20 | 0.15 | 0.15 | 0.20 |
| DAP/DAS | 20 | 20 | 20 | 12 | 20 | 13 | 31 | 20 | 12 | 20 |
| Boric acid compound/DAS | 20 | 20 | 6.5 | 6 | 20 | 10 | 15.4 | 16.7 | 10 | 13.5 |
| DAP/boric acid compound | 1 | 1 | 3.1 | 2 | 1 | 1.3 | 2 | 1.2 | 1.2 | 1.5 |
| Number of transitions: | | | | | | | | | | |
| 10 | 0 | 0 | 0 | 0 | 0 | 0 | 0 | 0 | 0 | 0 |
| 50 | 0 | 0 | 0 | 0 | 0 | 0 | 0 | 0 | 0 | 0 |
| 200 | 0 | 0 | 0 | 0 | 0 | 0 | 0 | 0 | 0 | 0 |
| 250 | 0 | 0 | 0 | 0 | 0 | 0 | 0 | 0 | 0 | 0 |
| 300 | 0 | 0 | 0 | 0 | 0 | 0 | 0 | 0 | 0 | 0 |
| 350 | 4 | 0 | 0 | 0 | 0 | 0 | 0 | 0 | 0 | 0 |
| 400 | 4 | 0 | 0 | 0 | 0 | 0 | 0 | 0 | 0 | 0 |
| 450 | 4 | 0 | 0 | 0 | 0 | 0 | 0 | 0 | 0 | 0 |
| 500 | 4 | 0 | 0 | 0 | 0 | 0 | 0 | 0 | 0 | 0 |
| 510 | 20 | 4 | 0 | 0 | 0 | 0 | 0 | 0 | 0 | 0 |
| 520 | 32 | 8 | 0 | 0 | 0 | 0 | 0 | 0 | 0 | 0 |
| 530 | 36 | 12 | 0 | 0 | 0 | 0 | 0 | 0 | 0 | 0 |
| 540 | 40 | 16 | 0 | 0 | 0 | 0 | 0 | 0 | 0 | 0 |
| 550 | 40 | 16 | 4 | 0 | 0 | 0 | 0 | 0 | 0 | 0 |
| 560 | 44 | 48 | 4 | 0 | 0 | 0 | 0 | 0 | 0 | 0 |
| 570 | 56 | 60 | 8 | 0 | 0 | 0 | 0 | 0 | 0 | 0 |
| 580 | 64 | 68 | | 0 | 0 | 0 | 0 | 4 | 0 | 0 |
| 590 | 72 | 72 | | 0 | 0 | 0 | 0 | 4 | 0 | 0 |
| 600 | 72 | 72 | | 0 | 0 | 0 | 0 | 8 | 0 | 0 |
| 610 | 88 | 80 | | 0 | 0 | 0 | 0 | 8 | 0 | 0 |
| 620 | 88 | 84 | | 0 | 0 | 0 | 0 | 8 | 0 | 0 |
| 630 | 100 | 96 | | 0 | 0 | 0 | 0 | 12 | 0 | 0 |
| 640 | | 100 | | 0 | | 0 | 0 | 12 | 0 | 0 |
| 700 | | | | 8 | | 0 | 0 | | *0 | **0 |

*Passed through over 1200 transitions with no breakage.
**Passed through over 1400 transitions with no breakage.